J. A. FIFE.
Safety-Hitching Device.
No. 220,820. Patented Oct. 21, 1879.
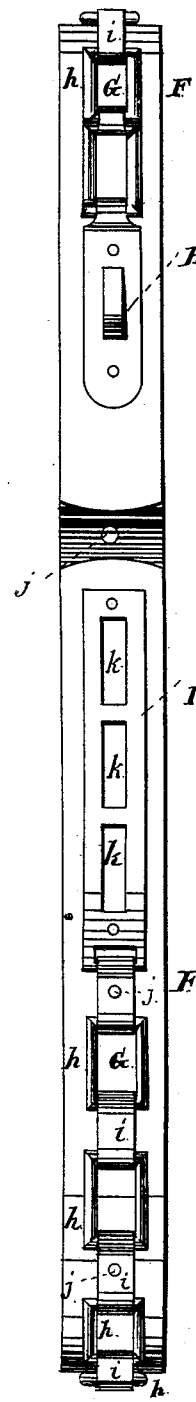
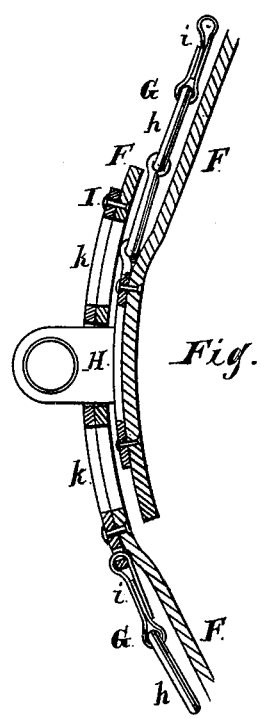
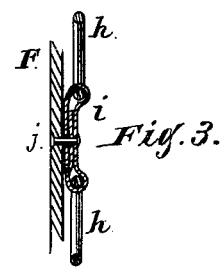
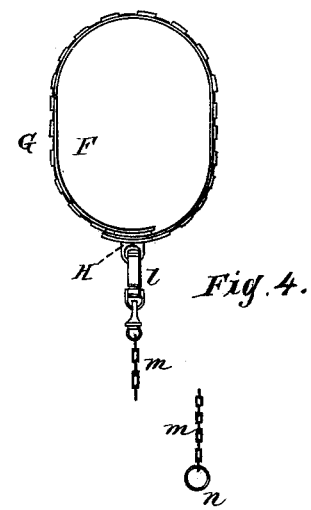

UNITED STATES PATENT OFFICE.

JOEL A. FIFE, OF CHICAGO, ILLINOIS.

IMPROVEMENT IN SAFETY HITCHING DEVICES.

Specification forming part of Letters Patent No. 220,820, dated October 21, 1879; application filed February 8, 1879.

*To all whom it may concern:*

Be it known that I, JOEL A. FIFE, of Chicago, Cook county, State of Illinois, have invented certain new and useful Improvements in Safety Hitching Devices, of which the following is a full description, reference being had to the accompanying drawings, in which—

Figure 1 is an elevation of the collar with the ends separated; Fig. 2, a longitudinal section of overlapping ends of the collar; Fig. 3, a detail section, showing the manner of connecting the chain and strap together; and Fig. 4, a figure showing all of the parts connected, the scale being reduced.

The object of this invention is to so construct a halter or hitching-strap that it cannot be disconnected in its parts or from the hitching post or ring without the key to the lock, thereby prevent the unauthorized removal or the theft of horses or other animals; and its nature consists in combining the several together and in improvements of the parts, as is hereinafter more fully described and claimed as new.

In the drawings, F indicates the collar-strap; G, the collar-chain; H, the eye or loop, through which the lock passes; I, the connecting-plate; *h*, links of the collar-chain; *i*, plates for connecting the links together; *j*, rivets for connecting the plates *i*, or a portion of them, with the strap F; *k*, openings or slots in the plate I for changing the size of the collar; *l*, lock; *m*, a hitching-chain, and *n* a hitching-ring stop.

The simplest form of constructing the device is to use a neck-strap, as shown. This strap F is a flat strap made of ordinary harness-leather, belting, or other suitable material, and the outer surface is provided with a chain, G, which chain has angular links *h*— but the corners may be rounded off—which links may be made of malleable cast-iron. These links are connected together by plate-links *i*, which may be cast or cut from sheet metal and folded. A portion of these plate-links, or all of them if desired, are punched at or near the middle, and are fastened to the strap by means of rivets *j*, which sufficiently connects them together without covering the chain with leather, which may be done; but it adds unnecessary weight and expense to the device.

One end of the chain is provided with the plate I, having openings *k* of sufficient size to pass over the loop H, and thus connect the two ends together, and afford means for attaching the strap to or detaching it from the neck of the animal.

The strap F prevents the chain from wearing or fretting the neck, and the chain not only gives additional strength, but it prevents the strap from being cut or the escape of the animal if it should be cut, as the strap and chain are each complete and capable of independent action in case either should break or become detached, the plates H I being strongly attached to the strap as well as to the chain. The ends are fastened together by the lock *l*, which is passed through the loop or staple H. To this lock a chain, *m*, is attached by a swivel and a bail, or otherwise, and the other end of the chain is provided with a ring, *n*, of sufficient diameter to prevent its being drawn through the hitching ring or hole in the hitching-post, and the manner of hitching for safety is to draw the lock and chain through the ring or hole, and then fasten the lock in the loop or staple H; and for this purpose the lock is made small enough to pass through an inch and three-quarter hole or ring.

The ring *n* at the end of the chain *m*, being larger than the hitching hole or ring, prevents the unhitching or forcing at that end of the chain *m*, and the lock will prevent unhitching or detaching at the other end, thus making a complete safety hitching device.

What I claim as new, and desire to secure by Letters Patent, is—

As an improved article of manufacture, a safety-halter having the strap F and chain G extending the entire length of the strap, constructed as described, and connected with the strap by the plates H I and rivets *j*, and adapted to be used with the chain *m*, lock *l*, and enlarged ring *n*, substantially as specified.

JOEL A. FIFE.

Witnesses:
L. L. BOND,
O. W. BOND.